Patented Jan. 20, 1942

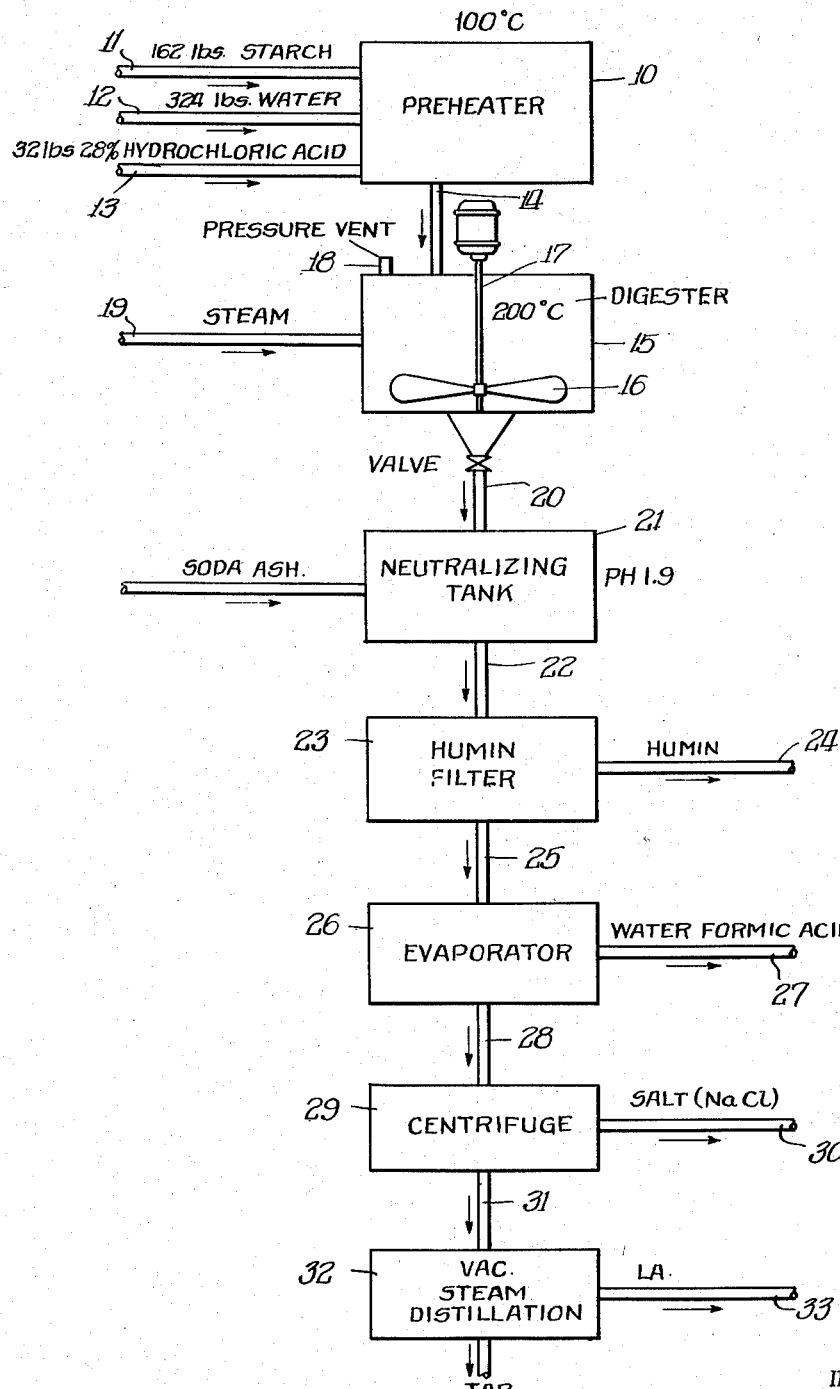

2,270,328

UNITED STATES PATENT OFFICE 2,270,328

PREPARATION OF LEVULINIC ACID

Wendell W. Moyer, Decatur, Ill., assignor to A. E. Staley Manufacturing Company, Decatur, Ill., a corporation of Delaware Application March 27, 1940, Serial No. 326,248

8 Claims. (Cl. 260—528)

The present invention relates to an improved process for the formation of levulinic acid.

Levulinic acid has been produced heretofore but in general the prior processes have not been sufficiently workable to result in the production of levulinic acid at a price which would make the material commercially attractive.

A principal object of the present invention is the provision of an improved process by which a relatively pure levulinic acid may be produced at a reasonable cost from dextrose-containing carbohydrates under particular conditions of temperature, pressure and concentrations.

A further object of the invention is to provide a levulinic acid producing process by which good yields of a high grade product may be obtained, the process involving the use of smaller concentrations and quantities of catalytic acid for transformation of a dextrose-containing carbohydrate than have been employed heretofore.

Still another object of the invention is the production of levulinic acid from dextrose-containing carbohydrates by a process involving the use of temperatures above 175° C. for a period of time at least twice that required to decompose 99 per cent of the dextrose from which the material is produced at the specified temperature, a hydrochloric acid solution of not more than 3.5 percent strength being employed and the mol ratio of hydrochloric acid to dextrose being less than 0.35.

Another object of the invention is the treatment of a dextrose-containing material with a dilute acid solution under such conditions as to produce levulinic acid and a granular form of humin as a by-product.

Still another object of the invention is the provision of a levulinic acid process in which a dextrose-containing material is converted to levulinic acid and by-products by treatment with a dilute acid as specified, the resulting acidic solution is filtered for removal of humin, the filtered liquor is neutralized with respect to the hydrochloric acid content, the neutralized solution is concentrated, the concentrated solution is subjected to an operation for the removal of the resulting crystalline sodium chloride, and the mother liquor after the removal of sodium chloride is subjected to a vacuum distillation process for the removal of levulinic acid.

These and other objects will be observed upon a consideration of the following description of a preferred embodiment of the invention and by reference to the accompanying drawing, in which the single figure represents a diagrammatic view of apparatus with which to carry out the process and also represents a flow plan of the process.

In the production of levulinic acid heretofore various keto- and aldo-hexoses and polysaccharides have been employed. Included in these materials are substances such as sucrose, levulose, dextrose and starch. The reaction by which the levulinic acid is produced upon acid treatment under the proper conditions involves the breakdown of the hexose sugar to levulinic acid, humin, formic acid and minor quantities of complex soluble substances which make up a tar that remains after removal of the levulinic acid.

The material employed for producing levulinic acid in accordance with the present invention consists of a dextrose-containing carbohydrate such as dextrose itself or starch. Preferably starch is employed, although it will be recognized that a number of other dextrose-containing carbohydrates such as confectioners' glucose and other hydrolytic products of starch may be utilized. Cane sugar is a disaccharide containing dextrose and levulose and likewise may be employed, the levulose breaking down to form levulinic acid at an even faster rate than the dextrose.

Starch is a preferred starting material by reason of its economic availability, and for the purpose of simplicity the following description of the process will be made with reference to starch.

An initial step in the process may include charging the proper amount of starch and hydrochloric acid to a preheater in which the temperature of the mixture may be raised at atmospheric pressure to approximately 100° C. I have found that the process is benefited to a material extent by use of a dilute solution of hydrochloric acid and a particular ratio between the amount of hydrogen chloride and the amount of starch charged to the process. In accordance with my process the acid employed in converting the starch to levulinic acid contains not more than 3.5 per cent by weight of hydrogen chloride. If higher acid concentrations are used, difficulties are encountered in the physical operation of the process at no beneficial gain in yield. While it is possible to obtain satisfactory results by employing an acid which is of 0.5 to 3.5 per cent concentration, it is preferred to utilize an acid concentration of 1.5 to 2.5 per cent strength.

In addition to the use of a dilute acid I have found that it is of importance to properly relate the total quantity of hydrogen chloride to the dextrose units of the starch. While a mol ratio of hydrogen chloride to the dextrose units of 0.35 or less is permissible, it is preferred to maintain such a ratio of between 0.15 and 0.25.

Although quite desirable the preheating step may be omitted and the charge of reactants may be immediately added to a pressure digester. Within the pressure digester the charge of starch and acid is slowly raised to a temperature between 175° C. and 215° C., after which the mixture is maintained at this elevated reaction temperature for a sufficient period of time to complete the formation of levulinic acid. A reaction temperature between 190° C. to 200° C. is preferred.

The manner in which the reaction mixture is brought from about 100° C. to the elevated reaction temperature has a material bearing upon the success of the process. In heating the reaction mixture to around 100° C., as in the preheater, the only reaction involved is the solubilization of the starch and conversion of some of the starch to dextrose. As the temperature of the mixture is raised from 100° C. to about 200° C. I have found that proper regulation of the heating conditions will afford definite beneficial results in the physical operation of the process. This temperature regulation includes a controlled heating operation as by live steam at a rate of 1° C. to 4° C. per minute. Even more careful temperature regulation of the order of 1.5° to 2.5° C. is preferred. A more rapid rise in temperature makes control of the process difficult due to the initiation of a violent exothermic reaction in which undue quantities of humin and non-condensable gases are formed. These gases effect an excessive rise in the pressure within the digester. Thus, the preliminary heating of the reaction mixture to the optimum range may require a time of the order of fifty to sixty minutes. During this initial heating period a further conversion of the starch to dextrose occurs and there is some transformation of dextrose to intermediate substances and some levulinic acid, although the time involved is insufficient for the production of substantial quantities of levulinic acid. However, when the range of 175° C. to 215° C. is reached under the conditions of the process the levulinic acid producing reaction occurs at a very rapid rate without the formation of a type of humin which is objectionable in the process. It is probable that the controlled heating in the first part of the process from 100° C. to the maximum reaction temperature effects a breaking down of some dextrose to intermediate compounds which makes possible the quick final conversion at the temperature involved.

At the temperature of 175° C. to 215° C. the autoclave will have a pressure corresponding to the steam pressure at this point or slightly more than this theoretical pressure due to the formation of non-condensable gases such as carbon dioxide and carbon monoxide. As a matter of fact, the pressure may be used as an indication of the temperature in a standardized process, since the pressure within the autoclave is more easily determined than the temperature.

When the temperature of the reaction mixture has been raised through the preliminary stage to the reaction range stated the temperature and pressure may be maintained substantially constant for the remainder of the process. The levulinic acid producing reaction is exothermic and requires little or no additional steam for maintaining the reaction mixture at 200° C. for completion of the process. Undue rises in temperature may be controlled by venting the digester. After the gradual heating of the starch suspension from 100° C. described in the preliminary step the reaction is completed in a relatively short time at the elevated temperature of about 200° C.

The disappearance of dextrose from the reaction mixture, as may be determined by optical activity, is an indication of the stage of the conversion, although I have found that this disappearance is not necessarily attended by a corresponding formation of levulinic acid. The reaction mixture is maintained at the elevated range of 175° C. to 215° C. for a period at least twice that necessary to effect decomposition of 99 per cent of the dextrose from the reaction mixture at the temperature involved.

I have found that there is a definite relation between the important variables, temperature, acid concentration, and time of reaction in the levulinic acid process.

The time for the decomposition of 99 per cent of the dextrose in the process at any given temperature and acid concentration may be calculated approximately according to the following formula:

$$t = \text{antilog}\left[(25.58 - \log^2 c - 12.5 \log c)^{\frac{1}{2}} + \frac{7790}{K} - 22.459\right]$$

wherein $t$ is time in hours, $c$ is concentration of hydrochloric acid in grams of hydrogen chloride per 100 grams solution, and $K$ is temperature on the absolute scale. Accordingly, in controlling the latter stage of the process the temperature is maintained at the elevated range for a period of time equal to at least twice the time for the disappearance of 99 per cent of the dextrose as calculated by the formula. In general, it will be sufficient to maintain this temperature for a period of from 2 to 4 times the value of $t$ derived from the formula. Within this time the maximum amount of levulinic acid will have been formed.

A further operating factor having a material bearing on the satisfactory conversion of the dextrose to levulinic acid and the recovery of this levulinic acid is in the controlled agitation of the reaction mixture in the autoclave during the digestion. Otherwise, considerable difficulty will be encountered in levulinic acid processes by the formation of a carbonaceous material termed humin. The humin tends to form in relatively large and hard lumps or as a thick crust around the walls of the converter and on top of the reaction mixture. By employing controlled heating and efficient mechanical agitation of the reaction mixture during the initial stage of the process and continued agitation during the heating at the relatively high temperature, there is produced a granular type of humin which does not form a crust or large lumps. The granular particles of humin produced under the conditions of my process are relatively small, hard and readily filterable. In such condition the entire charge of humin is carried out of the pressure converter along with the discharge of the reaction mixture. It then is unnecessary to open the converter for cleaning out humin. Furthermore, the granular form of humin is of such nature as to be easily separated from the mother liquor without material loss of levulinic acid. As a matter of fact, the humin produced in this manner is of such form as to be adapted for other uses, so that it is not a process loss.

After completion of the conversion operation the reaction mixture and the granular humin are subjected to neutralization with soda ash for conversion of free hydrochloric acid to sodium chloride. Thereafter the humin is filtered from the reaction mixture and the latter is evaporated for removal of substantial quantities of water, formic acid and other volatile substances other than levulinic acid. This evaporation effects crystallization of the sodium chloride formed in the neutralization process and the latter may be removed by centrifuging or otherwise. After removal of the sodium chloride the mother liquor is subjected to steam distillation under vacuum, by which operation levulinic acid is distilled and recovered in a relatively pure form. A pressure of not more than 14 millimeters of mercury is desirable in keeping the distillation temperature of the levulinic acid down to a point at which a light colored product is produced. The distillation is discontinued while the tar residue still is fluid and may be removed from the distillation equipment as such for further treatment.

The process may be further understood by reference to a specific example of its operation. As indicated in the drawing, a preheater 10 is charged with 162 lbs. of starch through the line 11. Three hundred twenty-four lbs. of water is passed into the preheater through the line 12. It will be understood that normally the water and starch will be mixed together and introduced together into the preheater as a slurry. This mixture of water and starch will have a Baumé of approximately 18.5 and the mixture will contain approximatey 33.3 per cent starch. Commercial hydrochloric acid in the amount of 32 lbs. of 28 per cent hydrogen chloride is introduced into the preheater through the line 13.

In the preheater the resulting mixture is brought to a temperature of approximately 100° C. in any suitable manner, as by closed steam coils.

The preheated reaction mixture then is charged through line 14 to a pressure digester 15. The digester 15 is provided with an efficient mechanical agitator 16 which is operated in a conventional manner by means of a rotative shaft 17 extending upwardly through the tank to a motor. The digester is also provided with a pressure vent 18 which is of such construction as to permit the escape of gas from the digester when the pressure reaches a certain predetermined point which may be of the order of 175 lbs. to 215 lbs. per square inch or slightly more, thereby providing for automatically controlling the upper temperature limit in the digester. Live steam is introduced into the digester through the line 19 to raise the temperature of the digestion mixture. The steam condenses to some extent in the digester in raising the temperature of the reaction mixture and this condensation effects a further dilution of the acid. Apparently this further dilution of the acid is beneficial to the nature of the reaction. The steam through line 19 is controlled to raise the temperature of the reaction mixture from 100° C. to around 200° C. at a rate which averages approximately 2° C. per minute. When the temperature of the reaction mixture in the digester gets to 200° C. the steam is reduced or cut off as necessary to maintain this temperature for a period of about 25 minutes, this period being sufficiently long to complete the formation of levulinic acid and being more than twice the period of time necessary to effect decomposition of 99 per cent of the dextrose under the conditions of the process. The reaction by which the levulinic acid is formed is exothermic and the steam which is introduced into the digester is controlled in accordance with reaction conditions within the digester so as not to permit the reaction to get out of control. The agitator 16 has the effect of preventing undue local reaction and has the further highly beneficial result of producing the discrete, hard, granular form of humin particles referred to hereinbefore.

The liquor from the digester will contain a total of about 56 lbs. of levulinic acid, corresponding to a yield of 48.5 per cent of the yield theoretically possible.

At the completion of the digestion the mixture is discharged through line 20 to a neutralizing tank 21, wherein a sufficient quantity of soda ash is added to react with the free hydrochloric acid present in the reaction mixture. At this point the liquor will have a pH of approximately 1.9.

The neutralized liquor is passed from tank 21 through line 22 to a humin filter 23. In this filter the discrete granular form of humin is easily separated from the liquor. Residual quantities of the liquor may be washed from the humin separated in the filter and the humin is withdrawn from the process through line 24. Approximately 50 lbs. of granular moist humin may be removed at this point.

The filtrate from the humin filter is passed through line 25 to an evaporator 26 where the concentration of the liquor is reduced to such an extent as to effect crystallization of the bulk of the sodium chloride contained therein. The evaporation results in the removal of water, formic acid and other volatile constituents of relatively low boiling point, these volatiles being removed through line 27.

After evaporation of the liquor to the desired extent it is passed through line 28 to a centrifuge 29 wherein the crystalline sodium chloride is removed and taken from the process through line 30.

The liquor then is passed through line 31 to a vacuum steam distillation apparatus 32. The vacuum steam distillation is carried out at less than 14 millimeters of mercury pressure and the overhead passing through line 33 contains the levulinic acid in a light colored, relatively pure form. The distillation is stopped while the residue in the distillation chamber is still fluid.

Various changes in the procedure described herein may be made without departing from the scope of the invention as defined in the appended claims.

I claim:

1. The process for producing levulinic acid, which comprises providing a mixture of a dextrose-containing carbohydrate and hydrochloric acid, the concentration of said acid being not more than 3.5 per cent hydrogen chloride and the mol ratio between the hydrogen chloride and the dextrose units of said carbohydrate being not more than 0.35, subjecting said mixture to controlled heating under pressure to raise the temperature thereof to between 175° C. and 215° C. at a rate not exceeding 4° C. per minute, maintaining said mixture under said conditions of temperature and pressure for a period of time at least twice that necessary for the decomposition of 99 per cent of said dextrose, agitating said mixture during said treatment sufficiently to provide a granular type of humin, removing said humin, neutralizing the hydrochloric acid of said mixture, evaporating the neutralized mixture to crystallize the salt formed by said neutralization, removing said salt, and subjecting the reaction mixture to vacuum steam distillation for separation of levulinic acid.

2. The process of producing levulinic acid from a dextrose-producing carbohydrate, which comprises providing a mixture of said dextrose-producing carbohydrate and hydrochloric acid with a mol ratio of hydrogen chloride to dextrose units of between 0.15 and 0.25, said hydrochloric acid having a concentration of between 1.5 per cent and 2.5 per cent hydrogen chloride, subjecting said mixture to heat by live steam under pressure at a rate which will provide a temperature rise of from 1.5° C. to 2.5° C. per minute until the temperature of said mixture is between 190° C. and 200° C., maintaining the mixture at said temperature of between 190 C. to 200° C. for a longer period of time than necessary for decomposition of 99 per cent of the dextrose in said mixture, mechanically agitating the mixture during said operation, and separating levulinic acid from the reaction mixture.

3. In the production of levulinic acid, the steps which comprise subjecting a reaction mixture of a dextrose-producing carbohydrate and hydrochloric acid to heat and pressure to produce a conversion of said carbohydrates to levulinic acid and humin type compounds, and subjecting the mixture to sufficient mechanical agitation during the conversion reaction to produce a granular type of humin compound.

4. In the production of levulinic acid, the steps which include subjecting a dextrose-producing carbohydrate and hydrochloric acid of a strength not more than 3.5 per cent hydrogen chloride to the action of heat and pressure sufficient to effect conversion of said carbohydrate to levulinic acid and humin type compounds, and mechanically agitating the reaction mixture during said conversion, said agitation being of sufficient intensity to produce said humin type compounds in granular form.

5. In the process of forming levulinic acid, the steps which include subjecting a reaction mixture composed of a dextrose-producing carbohydrate and hydrochloric acid of a strength not more than 3.5 per cent hydrogen chloride to the action of live steam under pressure at a temperature between 175° C. and 215° C. for a period of time at least twice that necessary for destruction of 99 per cent of the dextrose, and recovering levulinic acid from the reaction mixture.

6. The process of producing levulinic acid, which comprises heating a starch slurry and dilute hydrochloric acid having a mol ratio to the dextrose unit of said starch of less than 0.35 under pressure with live steam to an elevated temperature of 175° C. to 215° C., controlling the heating to said elevated temperature so that the reaction mixture does not rise at an average of more than 4° C. per minute, and recovering levulinic acid from the reaction mixture.

7. The process of producing levulinic acid, which comprises reacting a dextrose-producing carbohydrate and acid to produce a reaction mixture containing levulinic acid and humin, separating the humin, neutralizing the resulting liquor to a pH of approximately 1.9, concentrating the liquor to produce crystallization of salt, separating salt from the liquor, and subjecting the liquor to vacuum steam distillation to recover levulinic acid.

8. The process of forming levulinic acid, which comprises subjecting a dextrose- containing carbohydrate to reaction with hydrochloric acid at an elevated temperature, the time involved in said reaction being at least twice that determined by the formula $$t = \mathrm{antilog}\left[(25.58 - \log^2 c - 12.5 \log c)^{\frac{1}{2}} + \frac{7790}{K} - 22.459\right]$$

where $t$ is time in hours, $c$ is concentration in grams of hydrogen chloride in 100 grams reaction solution and $K$ is the temperature of the reaction mixture on the absolute scale.

WENDELL W. MOYER.